3,263,926
ANTI-SCALD SHOWER CONTROL

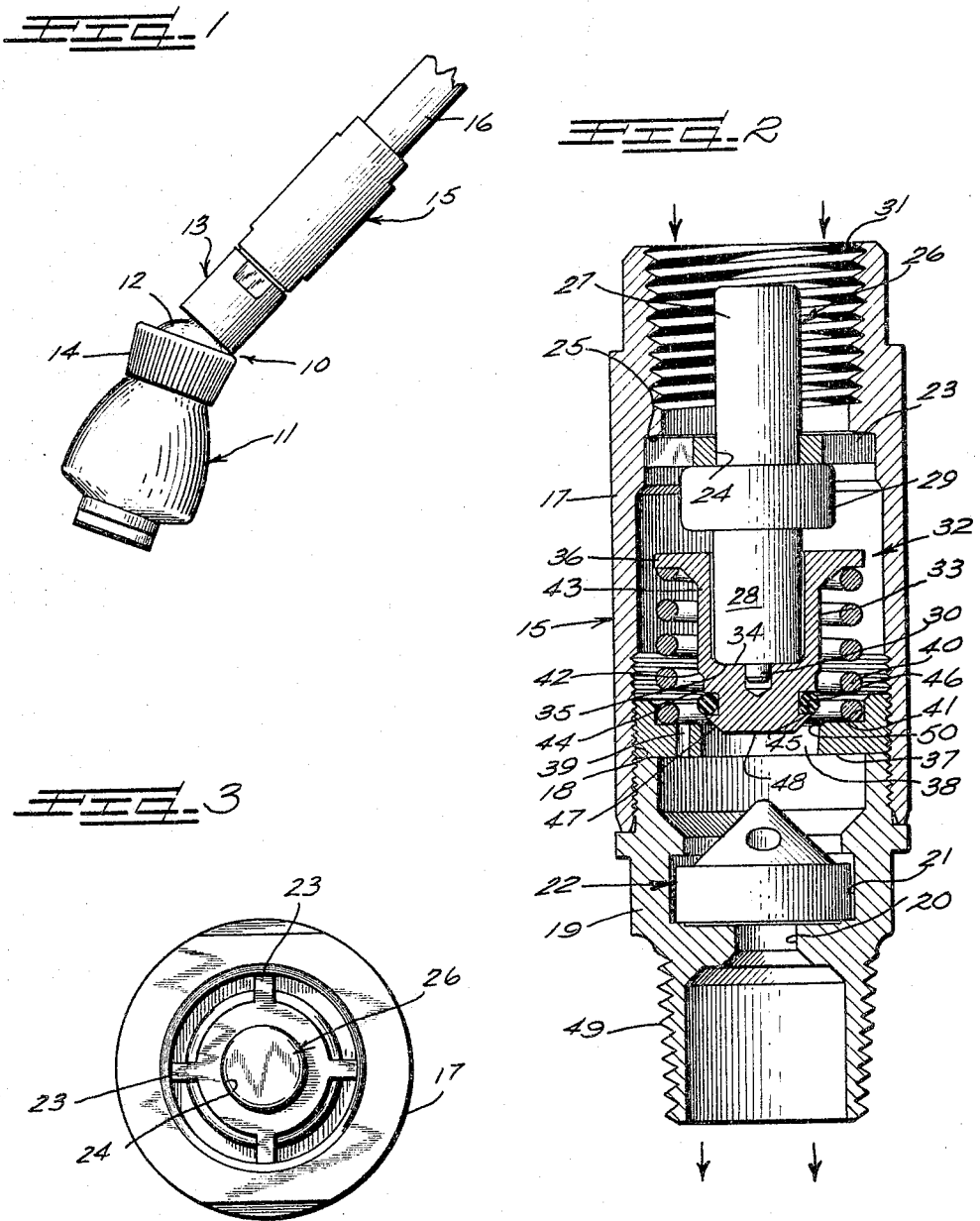

Robert W. Couffer, Deerfield, and Joseph M. Algino, Chicago, Ill., assignors to The Dole Valve Company, Morton Grove, Ill., a corporation of Illinois
Filed Nov. 6, 1963, Ser. No. 321,957
3 Claims. (Cl. 236—93)

The present invention relates to a thermostatic rate of flow control device and more particularly relates to a shower spray assembly including means for preventing the bather from being scalded with a pulse of hot water in the line.

The present invention comprises generally a shower spray assembly which is designed to a uniform volume of water from the shower head unit irrespective of variances in line pressures and to prevent scalding of the bather by cutting off the shower spray when a predetermined temperature is reached in the water supply line.

The present invention encompasses a shower spray assembly wherein a valve member is effective to reduce water flow from the shower head under predetermined upstream temperature conditions to a point such that spray from the shower head will be discontinued. Means are however provided to bypass a small amount of water through the shower spray assembly and this water will pass from the shower head in a vertical stream, being not under sufficient pressure to form a spray. As a consequence, hot water upstream of the shower head will be drawn off. As soon as water of the more normal bathing temperatures flows to the assembly full flow of water will be resumed. The action is quick and the bather is protected from receiving a severe scald.

It will be appreciated that the present invention is not limited to use in connection with shower heads and will of course find application in many instances in which thermostatic regulation of liquid flow is desired.

It is therefore a principal object of the present invention to provide a thermostatic rate of flow control device which is effective to substantially reduce although not completely shut off liquid flow therethrough when the temperature of liquid flowing through the device rises above a predetermined temperature.

Another object of the present invention resides in the provision of a thermostatic rate of flow control device incorporating a temperature sensitive power unit having a simple and effective means for compensating for power unit piston overtravel takeup.

Another and more specific object of the present invention resides in the provision of a shower spray assembly including means for regulating the flow of water therethrough as a function of the temperature of bath water and for maintaining a constant water delivery rate under normal operating conditions.

These and other objects, features and advantages of the present invention will become apparent from time to time as the following specification proceeds and with reference to the accompanying drawings, wherein:

FIGURE 1 is a side elevational view of a shower spray assembly constructed in accordance with the principles of the present invention;

FIGURE 2 is a vertical sectional view through the fitting part of the shower spray assembly illustrated in FIGURE 1 and showing some parts in side elevation for the purpose of greater clarity; and FIGURE 3 is a top plan view of the fitting part of the shower spray assembly shown in FIGURE 2 and looking in the direction of the arrows.

The shower spray assembly 10 illustrated in FIGURE 1 comprises generally a shower head 11 which is rockably mounted on the ball 12 of a connector 13 by means of a cylindrical clamping ring 14 which is screw threaded onto the shower head 11. A two-part fitting 15 is interposed between the connector 13 and a water supply line or pipe 16. The pipe 16 will be connected into the household water system and will generally be designed to provide both hot and cold water to the shower head 11 through the means of manual regulation of hot and cold water valves which are not shown.

The two-part fitting 15 comprises generally a tubular section 17 which is internally threaded as at 18 and which is screwed onto a flow control fitting 19.

It will be sufficient to state that a small diameter flow port 20 leads through the flow control fitting 19 and opens to a flow control well 21 within which is seated a resilient plural orifice flow control 22 which may be of the same character as that illustrated in and described in Erickson et al. Patent No. 3,006,378 which issued into patent on October 31, 1961. Deformable flow control members are well understood by those skilled in this art. It will be sufficient to state that the flow control member 22 is effective to maintain a relatively constant rate of flow downstream thereof regardless of variations in pressure upstream thereof so long as the water supply to it is under a pressure in excess of a predetermined minimum which will depend on the flow characteristics of the flow control device itself.

Concerning the various elements of the shower spray assembly in the order in which they are placed in assembled relation with one another, a spider 23 having a central aperture 24 and having openings spaced radially therearound is seated on a shoulder 25 of the fitting 15. A temperature sensitive power unit 26 having a sensing portion 27, a guide portion 28, a radially enlarged band 29, and a power member 30 guided for rectilinear movement within the guide portion 28, is mounted within the fitting 15 with the temperature sensing portion 27 extending through the aperture 24 into the inlet end 31 of the fitting 15 and with the band 29 seated on the spider 23.

The power unit 26 is of the usual solid fill type containing a microcrystalline wax or the like within the temperature sensing portion 27 which is arranged to fuse and expand upon rises in ambient temperature to and above a predetermined critical point to effect extensible movement of the power member 30 from the guide 28.

A valve member 32 comprises a hat-like valve head or sleeve 33 which is shown in FIGURE 2 as having an inner end wall 34 seated on an end wall 35 of the guide portion 28 of power unit 26 and extends around the guide portion 28 and terminates in an outturned flange 36 extending transversely to the axis of the power unit 26. An annular supporting transverse wall 37 is screw-threaded to the outlet or downstream end of the member 17 and has a large area flow port 38 formed centrally therein. A relatively small bleed port 39 is formed therein in spaced relation from the flow port 38. Compression spring 40 is contained within well 41 formed on the upstream side of the transverse wall 37 and has its opposite end seated on the outturned flange 36 of valve member 32 to bias the valve member 32 into engagement with the guide portion 28 of power unit 26 and to seat the power unit 26 on spider 23 and maintain spider 23 in its illustrated position in the fitting 15. The valve member 32 has an annular shoulder 42 formed therearound which tapers from a radially enlarged section 43 of the valve member 32 to a radially reduced portion 44 thereof which latter portion is of a diameter such as to have a sliding fit with the cylindrical flow port 38. An annular groove 45 is formed about the radially reduced portion 44 and has an O-ring 46 seated therein which, in the unstressed condition shown in FIGURE 2, has an O.D. greater than the diameter of the cylindrically walled flow port 38 to provide a fluid seal. In order to insure that the valve member 32 will be properly guided into the flow port 38 upon extensible movement of the power member 30 the radially reduced portion 44 thereof tapers as at 47 inwardly toward the end wall 48 thereof.

Flow control fitting 19 is then screw-threaded into the tubular fittings 17 and connector 13 carrying the shower head 11 can then be screwed onto the nipple end 49 of the flow control fitting 19 to place the parts in the assembled relation shown in FIGURE 1.

It will be observed that the bleed port 39 is at all times open so that water continuously flows therethrough. Keeping the principal purpose of this device in mind, it will be understood that the bleed port 39 is of such size as to permit the maximum flow possible through the assembly which will not flow from the shower head 11 in the form of a spray but which, on the contrary, will flow therefrom in more or less of a vertical stream.

It will then be observed that with the various parts in the position shown in FIGURE 2, the flow control 22 will act to maintain a relatively constant delivery rate of water irrespective of variances in pressure of the water upstream thereof. If a surge of scalding water should come through the line 16, the water will pass around the temperature sensing portion 27 of power unit 26 and the power member 30 will immediately be extended in the known manner. Upon such power member extension the valve member 32 will be moved against the opposing bias of the spring 40 and O-ring 46 will engage the wall of flow port 38 to completely shut off the flow of fluid therethrough. The spray of water from the shower head 11 will then immediately be discontinued and only a small volume vertical stream of water will pass from the shower head; being that water which passes through the bleed port 39. Once the scalding water has thus passed through the shower spray assembly and water of more moderate temperatures flows about the power unit 26 the spring 40 will then act to move the power member 30 retractibly and full flow through the flow port 38 will once again take place. It will be observed that since the O-ring 46 makes sliding contact with the wall of flow port 38, power member overtravel can be absorbed by the unit without causing rupture of the power unit 26. However, should the power member 30 reach the absolute limit of its extended movement the annular shoulder 42 will seat on the chamfered lip 50 of the flow port 38 to prevent any further axial movement of the power member.

It will be understood that this embodiment of the present invention has been used for illustrative purposes only and that various modifications and variations in the invention may be effected without departing from the spirit and scope of the novel concepts thereof.

We claim as our invention:
1. A shower spray temperature controlled rate of flow control device comprising:
    an elongated tubular fitting having an inlet at one end thereof and an axially aligned outlet leading from the opposite end thereof,
    a spider seated in said fitting adjacent the inlet end thereof and having a central opening leading axially therethrough and flow openings spaced around said central opening,
    a transverse wall mounted in said fitting adjacent the outlet end thereof and having a central port leading axially therethrough and a by-pass port disposed eccentrically of said central port,
    a temperature sensitive power unit seated on said spider and having a temperature sensing casing extending through said central opening into said inlet and also having a power element extensible from the opposite end thereof toward said port,
    a valve member seated on said element and having a flange spaced from said element toward said inlet and extending radially of said element,
    a spring seated on said transverse wall and said flange and retractibly moving said power element,
    said valve member having a tapered advance end and a cylindrical wall extending therefrom toward said temperature sensitive power unit,
    whereby hot water flowing about said sensing portion of said power unit will effect movement of said cylindrical wall of said valve element along said central port to block the flow of hot water through said central port, but accommodate the bleeding of water through said by-pass port.
2. The structure of claim 1,
    wherein an O-ring is seated in said cylindrical wall of said valve element for movement along said central port to positively seal said central port from the passage of hot water therethrough.
3. The structure of claim 2,
    wherein the outlet from said tubular fitting comprises a flow control fitting threaded within said fitting and having a flow control device therein effective to limit the flow rate through said outlet to a maximum rate determined by the characteristics of said flow control device.

References Cited by the Examiner

UNITED STATES PATENTS

| | | | |
|---|---|---|---|
| 1,639,286 | 8/1927 | Carson | 236—93 X |
| 1,918,184 | 7/1933 | Hartman | 251—332 X |
| 1,930,227 | 10/1933 | Donahue | 236—93 |
| 2,500,750 | 3/1950 | Halenza | 236—12 X |
| 2,584,877 | 2/1952 | Hoffman et al. | 236—34.5 X |
| 2,713,989 | 7/1955 | Bryant. | |
| 2,788,639 | 4/1957 | Kraft | 236—93 X |
| 2,837,282 | 6/1958 | Budde | 236—12 |
| 3,038,664 | 6/1962 | Gould | 236—93 |

ALDEN D. STEWART, *Primary Examiner.*